Jan. 29, 1935.  W. C. BUCKNAM  1,989,079
COUPLING FOR BLOWPIPES
Original Filed May 2, 1929
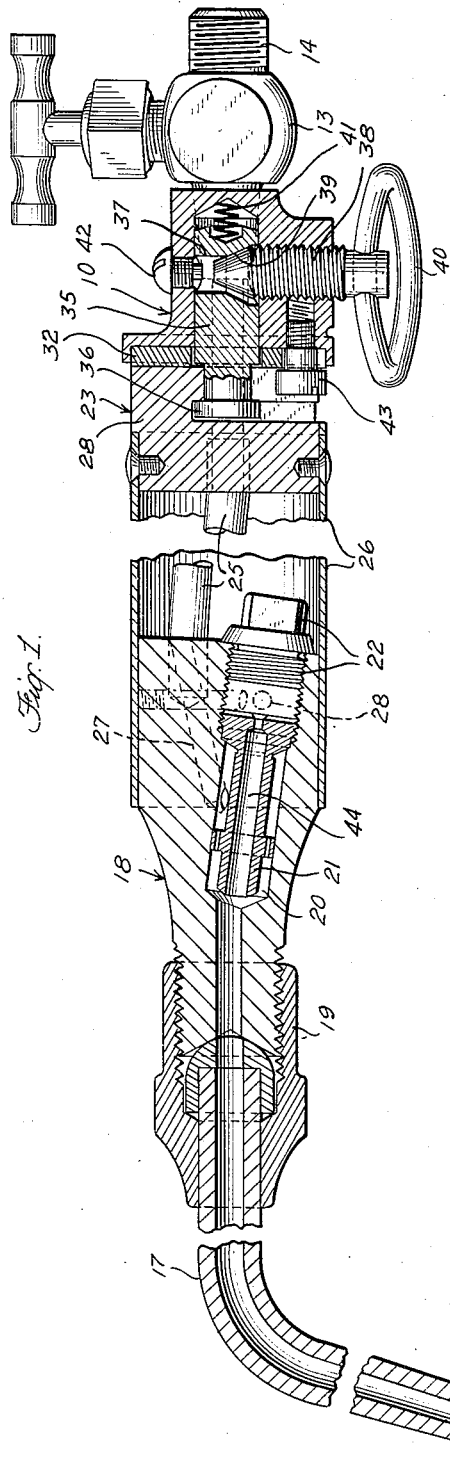

Patented Jan. 29, 1935

1,989,079

UNITED STATES PATENT OFFICE 1,989,079

COUPLING FOR BLOWPIPES

Worthy C. Bucknam, Mechanic Falls, Maine, assignor to Oxweld Acetylene Company, a corporation of West Virginia Application May 2, 1929, Serial No. 359,907
Renewed January 24, 1933

18 Claims. (Cl. 285—143)

This invention pertains to blowpipes and more specifically to improvements therein whereby they may be constructed more cheaply and coupled to a source of supply more quickly.

Heretofore, it has been common practice to provide an oxy-gas blowpipe with two joints or unions by which it could be coupled to a hose supplying fuel gas and a hose supplying oxygen. Each blowpipe was also provided with valves for controlling the volume of fuel gas and oxygen used thereby. When it became desirable, during a metal working operation, to change from one blowpipe to another it was customary to extinguish the blowpipe flame by closing the control valves and then go back to the source of supply and shut off the fuel gas and oxygen from the hose lines. The hose lines were then disconnected from one blowpipe by means of a wrench or other manually operable tool and connected to the other blowpipe by the same means. The fuel gas and oxygen were then turned back into the hose lines at the source of supply, and the control valves of the blowpipe opened to provide gas for the new flame. This was a very slow operation which wasted much of the operator's valuable time and, furthermore, with this blowpipe construction the hose connection unions and control valves are duplicated for each blowpipe which is also an unnecessary waste.

Therefore, one object of this invention is to provide a joint between the rear portion of a blowpipe comprising the hose connection unions and control valves, and the front of a blowpipe comprising the flame forming portion, so flame forming portions of different types may be coupled to one hose connection and control portion, and so the hose connection and control portion need not be duplicated for each blowpipe. Another object of this invention is to provide a joint that may be coupled and uncoupled manually without the use of wrenches or other tools. Other aims, objects, and novel features will be apparent from the following specification together with the accompanying drawing, in which:

Fig. 1 is a longitudinal section of a blowpipe embodying my invention;

Fig. 2 is a bottom view of the rear end of the blowpipe shown in Fig. 1;

Fig. 3 is a view of the coupling face of the flame forming unit, and

Fig. 4 is a view of the coupling face of the dual hose connection unit.

Broadly, the invention comprises separating the flame forming portion of a blowpipe from the hose connection and gas control portion and in providing a joint or coupling by means of which several flame forming units may be successively attached to the hose connection and gas control unit without the use of a wrench or other special tool.

The rear portion of the blowpipe shown in the drawing, which we shall henceforth call the dual hose connection unit, may comprise a casting 10 of any suitable metal such as brass or bronze having a control valve 11 extending to the rear thereof which is provided with a threaded member 12 adapted for being coupled to a hose line for supplying fuel gas such as acetylene, and a control valve 13 also extending to the rear thereof and provided with a threaded member 14 adapted for being coupled to a hose line for supplying oxygen. An opening or conduit 15 in the casting 10 is adapted for conducting the acetylene through the dual hose connection unit, and a similar opening or conduit 16 is adapted for conducting the oxygen through the dual hose connection unit. The control valves 11 and 13 may be of any suitable type such as ordinarily used to control the fuel gas and oxygen supplied to a blowpipe, and the hose connection members 12 and 14 may also be of any type suitable for the purpose.

The front portion of the blowpipe, which I shall henceforth call the flame forming unit, may comprise a tip 17 coupled to a casting 18 by a removable gland nut 19. The casting 18 is provided with a mixing chamber 20 having an injector nozzle 21 threaded therein and a plug 22 closing the rear end of said chamber. Another casting 23 forms the rear of the flame forming unit and this casting is joined to the casting 18 by two pipes or tubes 24 and 25 for conducting fuel gas and oxygen respectively and a surrounding tube 26 forming a handle for the blowpipe. A passage 27 in the casting 18 conducts fuel gas from the pipe 25 to the mixing chamber, and a passage 28 conducts oxygen from the pipe 24 to the mixing chamber. The flame forming unit shown and described herein is simply one of many forms adapted for use with the dual hose connection unit and the invention is not limited to this particular form but includes those adapted for forming either a metal welding or a metal cutting flame. In fact part of the utility of the invention resides in the construction and arrangement of the mechanism whereby a blowpipe of one kind may be quickly removed from the dual hose connection unit and replaced by another blowpipe of a different kind without unnecessary loss of time or recourse to wrenches or other special tools.

The mechanism by which the flame forming unit may be coupled to the dual hose connection unit comprises a coupling face on each of the units and means for clamping the faces together. For convenience the coupling faces may be substantially transverse to the longitudinal axis of the blowpipe and they may be practically flat or plane. Also, one of the coupling faces may be of a resilient material or a resilient material such as a gasket may be clamped between the coupling faces.

The rear end of the casting 23 of the flame forming unit may form one of the coupling faces and the front end of the casting 10 of the dual hose connection unit may form the other. The flame forming unit coupling face may be provided with two openings 29 and 30 which communicate with the tubes 24 and 25 respectively, and a radial slot 31 extending from the edge of the coupling face to a point half its width beyond the center. While this slot actually extends beyond the center of the coupling face it is usually considered as terminating at the center because a round member is at the center of the coupling face when at the inner end of the slot so, henceforth, the slot will be considered as terminating at the center of the coupling face. The slot 31 may be of any form having an enlarged inner portion such as a dovetail or, as shown in the drawing, a T-slot. While it may extend clear across the coupling face it has the advantage of serving as a stop for the member fitting therein when it terminates at the center.

The front end of the casting 10 of the dual hose connection unit may form the other coupling face. This face may be plain or it may be provided with a recess having a gasket 32 therein. This coupling face may also have two openings 33 and 34 therein which communicate with the passages 15 and 16 respectively. The dual hose connection unit may also have an axial opening extending inward from the coupling face with a reciprocable bolt 35 therein having a head 36 protruding from the coupling face and a transverse opening 37 within the dual hose connection unit. Threaded in a lateral opening in the casting 10 is a screw 38 having a conical or pointed inner end 39 projecting into the transverse opening 37 in the bolt 35 by which it may be drawn into the casting 10 when the screw 38 is manually rotated by means of a handle or ring 40 secured to the outer end thereof. A coiled spring 41 may be confined in a partially compressed condition between the inner end of the bolt 35 and the bottom of the recess in which it is held. This spring 41 tends to force the bolt 35 outward as the screw 38 is withdrawn from the transverse opening 37 in the bolt 35, and a screw 42 threaded in a transverse opening in the casting 10 in the side opposite from that of the screw 38 also enters the transverse opening 37 in the bolt 35 and prevents the spring 41 from forcing the bolt 35 out of the casting 10 when the conical point 39 of the screw 38 is entirely withdrawn from the transverse opening 37. A screw 43 threaded into the casting 10 and protruding from the coupling face is adapted for entering the T-slot 31 and cooperating with the bolt 35 to relatively position the flame forming unit and the dual hose connection unit so the openings 29 and 30 in one unit register with the openings 33 and 34 in the other. The slot 31 and the bolt 35 with its operating means form male and female interlocking elements or means by which the units may be clamped together and it is understood that this interlocking means may be arranged and operated differently, and the elements on one unit may be interchanged with those on the other.

When the flame forming unit and the dual hose connection unit are coupled together the blowpipe may be operated in the same conventional manner as blowpipes known heretofore. The threaded members 12 and 14 may be respectively coupled to hose lines supplying fuel gas and oxygen and then by opening the control valves 11 and 13 fuel gas may enter and flow through the passage 15, pipe 25, and opening 27 to the mixing chamber 20 where it is joined by oxygen entering through the opening 16, pipe 24, transverse opening 28, and the central opening 44 in the injector nozzle 21, where the combined oxygen and fuel gas flows outward through the tip 17 in the usual manner.

When it is desirable to change from one flame forming unit to another the first may be uncoupled from the dual hose connection unit by loosening the screw 38 and then the units may be separated by moving one in a lateral direction with respect to the other thereby sliding the head 36 of the bolt 35 out of the slot 31. The second flame forming unit may then be joined to the dual hose connection unit by sliding its bolt head 36 in the slot 31. The head of the screw 43 entering the slot 31 after the bolt head 36 thereby relatively positioning the units so their respective gas orifices are in alignment when the bolt head 36 strikes the inner end of the slot 31. With the units in this position they may be coupled by tightening the screw 38. The operation of changing flame forming units is very quick and simple and may be performed in from 15 to 20 seconds without the aid of wrenches or other tools.

Various alterations, modifications, and substitutions, may be made in the mechanism without departing from the spirit of the invention or sacrificing any of the rights thereunder.

I claim:

1. A coupling for a blowpipe comprising a flame forming unit provided with a coupling face and interlocking means forming a recess therein; and a dual hose connection unit provided with a coupling face, interlocking means projecting therefrom into said recess, and means for moving one of said interlocking means relative to one of said units to clamp said faces together thereby coupling said units.

2. A coupling for a blowpipe comprising a flame forming unit having a coupling face on one end thereof; and a dual hose connection unit having a coupling face on one end thereof; each of said coupling faces being provided with interlocking means adapted for being engaged by sliding one of said coupling faces radially with respect to the other; one of said units being provided with manually operable means moving transversely of said coupling for moving one of said interlocking means to clamp said coupling faces together thereby coupling said units.

3. A coupling for a blowpipe comprising a flame forming unit having a coupling face on one end thereof; and a dual hose connection unit having a coupling face on one end thereof; one of said faces being provided with stationary interlocking means below the surface thereof and the other with movable interlocking means projecting from the surface thereof; said interlocking means being engageable by moving one of said faces laterally with respect to the other; one of said units being provided with manually operable means for moving said movable interlocking means to clamp said coupling faces together thereby coupling said units.

4. The combination in a blowpipe of a flame forming unit provided with interlocking means, and a dual hose connection unit provided with interlocking means at the axis thereof; said interlocking means being engageable by moving one of said units in a direction transverse to its longitudinal axis; one of said interlocking means being manually movable to clamp said units together.

5. A coupling for a blowpipe comprising a flame forming unit provided with stationary interlocking means, and a dual hose connection unit provided with movable interlocking means adapted for engaging said first mentioned interlocking means, and a manually operable member movable transversely of said hose connection unit to couple said units together by moving said movable means.

6. A coupling for a blowpipe comprising a flame forming unit provided with interlocking means; a dual hose connection unit provided with interlocking means adapted for engaging said first mentioned interlocking means, means cooperating with said first mentioned interlocking means to locate one of said units with relation to the other and prevent relative rotary movement therebetween when said interlocking means are in engagement, and means for moving one of said interlocking means to clamp said units together.

7. A coupling for a blowpipe comprising a flame forming unit provided with a coupling face having a T-slot therein; and a dual hose connection unit provided with a coupling face and a solid bolt at the axis thereof having a head adapted to fit in said T-slot, and means for moving said bolt to clamp said coupling faces together.

8. A coupling for a blowpipe comprising a flame forming unit provided with a coupling face and a T-slot therein; a dual hose connection unit provided with a coupling face and a bolt having a head projecting therefrom adapted for entering said T-slot when said units are joined; means carried by said dual hose connection block and cooperating with said T-slot to hold said units in a predetermined relative position when joined; and manually operable means carried by said dual hose connection block for moving said bolt to clamp said coupling faces together.

9. A coupling for a blowpipe comprising a flame forming unit provided with a coupling face having a T-slot therein; a dual hose connection unit provided with a coupling face having a movable bolt protruding therefrom with a head adapted for entering said T-slot; and a stationary member protruding therefrom adapted for entering said T-slot and cooperating with said bolt to relatively locate said units; and manually operable means threaded into the side of said dual hose connection block for moving said bolt to clamp said coupling faces together.

10. A coupling for a blowpipe comprising a flame forming unit provided with a coupling face having a T-slot extending from the edge to the center thereof; a dual hose connection unit provided with a coupling face having a gasket seated therein and a movable bolt protruding from the center thereof having a head adapted for entering said T-slot and a transverse opening therethrough; a manually operable member threaded in said dual hose connection unit and provided with a conical point adapted for entering said transverse opening to move said bolt and thereby clamp said faces together; and a screw threaded into said dual hose connection block so the end thereof extends into said transverse opening to limit the travel of said bolt.

11. A coupling for a blowpipe comprising a flame forming unit having a transverse coupling face provided with a T-slot and a plurality of openings therein; a dual hose connection unit having a transverse coupling face provided with a plurality of openings therein, a bolt protruding therefrom adapted for fitting in said T-slot, and a locating member protruding therefrom adapted for entering said T-slot to hold said units in such a position that the openings in one unit register with those in the other unit; a gasket between said coupling faces; and means for manually moving said bolt to clamp said faces to said gasket.

12. A coupling for a blowpipe comprising a flame forming unit having a transverse coupling face provided with a radial T-slot therein; a dual hose connection unit having a transverse coupling face and a coaxial reciprocable solid bolt protruding from said face and provided with a head adapted for entering said T-slot; means for moving said bolt in one direction to clamp said faces together; and means for limiting the movement of said bolt in the other direction.

13. A coupling for a blowpipe comprising a flame forming unit provided with female interlocking means; a dual hose connection unit provided with male interlocking means adapted for engaging said female interlocking means; means adapted for cooperating with said female interlocking means to relatively position said units; manually operable means for moving said male interlocking means in one direction to clamp said units together; resilient means for moving said male interlocking means in the other direction; and means for limiting the movement of said male interlocking means in the latter direction.

14. A coupling for joining two blowpipe units comprising a flat face on one of said units having a recess therein; a flat face on the other of said units having two projections adapted for entering said recess; and means for moving one of said projections to clamp said faces together.

15. A coupling for joining two blowpipe units comprising a flat face on one of said units having a T-slot below and parallel to the surface thereof; a flat face on the other of said units having a bolt with a head projecting therefrom adapted for entering said T-slot, and a second projection also adapted for entering said T-slot to hold said faces in a fixed relative rotary position; and means for moving said bolt to clamp said faces together.

16. A coupling for joining two blowpipe units comprising a flat face on one of said units having two fluid passage openings and a radial T-slot therein; a flat face on the other of said units having two fluid passage openings therein, an axial bolt with a head projecting therefrom adapted for entering said T-slot, and a second projection adapted for entering said T-slot, to hold said fluid passage openings in rotary alignment; and means for moving said bolt to clamp said faces together.

17. A coupling for joining two blowpipe units comprising a face on one of said units having a slot therein with undercut sides; a face on the other of said units having a clamping member with a portion projecting therefrom adapted for entering said slot; the portion of said clamping member below said face having a lateral opening therein; and a manually movable member carried by said second unit having a cam face adapted for entering said lateral opening and moving said clamping member to clamp said faces together.

18. A coupling for joining two blowpipe units comprising a face on one of said units having a radial recess therein; a face on the other of said units having a movable projection adapted for entering said recess and holding said units in axial alignment, and a fixed projection adapted for entering said recess and holding said units in rotary alignment; and means for moving said movable projection to clamp said faces together.

WORTHY C. BUCKNAM.

CERTIFICATE OF CORRECTION.

Patent No. 1,989,079. January 29, 1935.

WORTHY C. BUCKNAM.

It is hereby certified that error appears in the printed specification of the above numbered patent requiring correction as follows: Page 3, first column, line 6, claim 4, strike out the words "The combination in a blowpipe of" and insert instead A coupling for a blowpipe comprising; and that the said Letters Patent should be read with this correction therein that the same may conform to the record of the case in the Patent Office.

Signed and sealed this 12th day of March, A. D. 1935.

Leslie Frazer (Seal) Acting Commissioner of Patents.